Patented Mar. 7, 1944

2,343,427

UNITED STATES PATENT OFFICE 2,343,427

FILTER

Donald H. Wells, Maplewood, N. J., and Melvin De Groote, University City, Mo., assignors to Purolator Products, Inc., Newark, N. J., a corporation of Delaware No Drawing. Application February 28, 1941, Serial No. 381,118

28 Claims. (Cl. 252—326)

This invention relates to filtration and filters therefor and relates more particularly to filtration of lubricating oil of internal combustion engines for the removal of solids therefrom.

The lubricating oil of an internal combustion engine, particularly a Diesel type engine, contains minute solids which filtering media, such as cloth, paper, cotton linters, wood pulp and the like, require considerable time to remove. The dirt removal rate of such filtering media depends upon a number of different conditions such as, in depth type filters, the method of assembling the medium, the density of the packing of the medium, the distribution of the oil passing therethrough, temperature, pressure and a number of other variables. In filters of the extended area type, the amount of surface area, temperature, pressure, viscosity of the oil and other factors affect the dirt removal rate.

An object of this invention is to increase sharply the dirt removal rate of filtering media of the types above mentioned.

We have found that in filtering lubricating oils of internal combustion engines the dirt removal rate of filtering media may be sharply increased by contacting the oil that is filtered by the filtering media with an ester product containing a polyhydric alcohol radical, a polybasic carboxylic acid radical, and a plurality of acyl-oxy radicals

derived from any detergent-forming mono-carboxy acid having 8 to 38 carbon atoms with the proviso that at least one is derived from an hydroxylated detergent-forming mono-carboxy acid having 8 to 38 carbon atoms, each of the hydroxyls of each polyhydric alcohol being esterified with a group containing at least one of said acyl-oxy radicals, the number of said groups esterified with polyhydric alcohol hydroxyls being as great as the total number of said polyhydric alcohol hydroxyls. In other words, the number of the groups comprising an acyl-oxy radical derived from a detergent-forming monocarboxy acid that are ester-linked to each polyhydric alcohol radical is in each instance equal to the valency of the polyhydric alcohol radical so that in the ester product each polyhydric alcohol radical is free from any uncombined hydroxyl radical directly attached thereto, and the number of such groups ester-linked to each polyhydric alcohol residue is additional to the number of such groups ester-linked to any other polyhydric alcohol residue contained in the ester. The ester product may be added to the filtering medium in order to increase the dirt removal rate of the filtering medium or may be contacted in some other way with oil passing through the filtering medium. Preferably the ester product is used according to this invention by including it in a filter for use in the lubricating system of an internal combustion engine so as to provide an improved filter having a high dirt removal rate.

Polybasic carboxy acids which may be employed in the esterification reaction may be exemplified by phthalic, succinic, malic, fumaric, citric, citriconic, maleic, adipic, tartaric, oxalic or the like. The anhydrides of such polybasic carboxy acids such as phthalic anhydride, maleic anhydride, etc., are the equivalents of the acids and in some respects are even more advantageous than the acids in the production of esters. When reference is made to polybasic carboxy acids the anhydrides thereof are also included. Other suitable polybasic acids may be prepared by the diene synthesis which involves condensation of alpha, beta unsaturated acids or anhydrides with compounds containing a conjugated double bond. For example, the condensation of maleic anhydride with alpha terpinene yields a dicarboxy acid which is suitable. Other polybasic carboxy acids may be prepared similarly by the diene synthesis involving condensation of an alpha, beta unsaturated monocarboxy acid with a carboxy acid containing a conjugated double bond. For example, crotonic acid may be condensed with abietic acid, which contains a conjugated double bond, to yield a dicarboxy acid suitable for use in the manufacture of ester products in increasing the rate of dirt removal from lubricating oils in a filtering operation. Functional equivalents of polybasic carboxy acids, such as chlorphthalic acid, may be employed.

Detergent-forming monobasic carboxy acids are those acids having at least 8 carbon atoms which have the capacity to react with alkali to form soap or soap-like products and are exemplified by fatty acids containing 8 to 32 carbon atoms such as oleic, linoleic, ricinoleic, stearic, hydroxy stearic, palmitic, linolenic, erucic, clupanodonic, myristic, etc., and fatty acids of the character referred to are normally regarded as preferable. The term detergent-forming carboxy acid includes naphthenic acids. Naphthenic acids are derived from various petroleums or are obtained by treatments which involve oxidation of hydrocarbon bodies present in the naturally occurring crude oils. The number of carbon atoms in naturally occurring naphthenic acids may vary from 10 carbon atoms to 38 carbon atoms. Naphthenic acid or admixtures of the type available on the open market and which preferably have a saponification value in the neighborhood of about 250 are suitable. Naphthenic acids of the kind referred to are readily esterified with glycerine to form naphthenin on intimate admixture and agitation in the presence of dried hydrochloric acid gas using a procedure that is substantially the same as that usually used in the formation of stearin from stearic acid and glycerol. It is known that such naphthenic acids can be treated, for example, with halogens so as to produce derivatives such as chlornaphthenic acids. Also included among the detergent-forming acids are those mono-carboxy acids sometimes called wax acids or paraffin acids, which are formed as a result of oxidation of paraffin or petroleum waxes, particularly those derived from paraffin base hydrocarbons and which include hydroxylated, as well as non-hydroxylated acids. Acids occurring in certain waxes such as carnaubic acid, cerotic acid, lanopalmic acid and lanoceric acid, are considered detergent-forming mono-carboxy acids. Rosin and resinic acids such as abietic acid are likewise included. Such acid materials due to the fact that they react with alkalis to form soap or soap-like products are commonly called detergent-forming acids.

The terms hydroxylated detergent-forming acids or hydroxy detergent-forming acids refer to those detergent forming acids which contain in the acyl radical thereof an hydroxyl or the equivalent. The most common types of hydroxylated detergent-forming carboxy acids are hydroxylated fatty acids containing 8 to 32 carbon atoms such as ricinoleic acid, mono- and dihydroxy stearic acid, trihydroxy palmitic acid, etc. Ester products adapted for use in increasing the dirt removal rate of filtering media according to this invention contain at least one radical of an hydroxylated detergent-forming acid and preferably such radical is a radical of an hydroxylated fatty acid containing 8 to 32 carbon atoms. In addition hydroxylated detergent-forming acids such as hydroxylated wax acids may be used.

While the terms detergent-forming mono-carboxy acid and hydroxylated detergent-forming mono-carboxy acid include oxidized acids as well as acids in their naturally occurring state, those fatty bodies which are drastically oxidized have distinctive properties and characteristics and certain ester products containing such drastically oxidized bodies are claimed in our application Serial No. 381,124 filed Feb. 28, 1941, for Filters.

A preferred ester product for increasing the dirt removal rate of filtering media may be obtained by esterification reaction between triricinclein and a polybasic carboxylic acid such as phthalic acid. Ricinoleic acid may be indicated by the following formula.

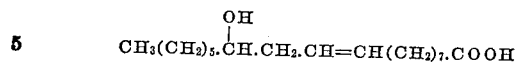

which may be regarded as coming within the more generic formula

OHRCOOH wherein OHRCOO is representative of the acyl-oxy group of any hydroxylated detergent-forming carboxy acid. If OHRCOO is the acyl-oxy group of ricinoleic acid, triricinolein may be represented by the formula

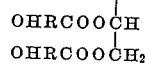

and contains the residue of the polyhydric alcohol glycerol which may be represented as

Triricinolein readily esterifies with phthalic acid and if three moles of phthalic anhydride are caused to react with one mole of triricinolein, an ester product will be obtained according to the following reaction.

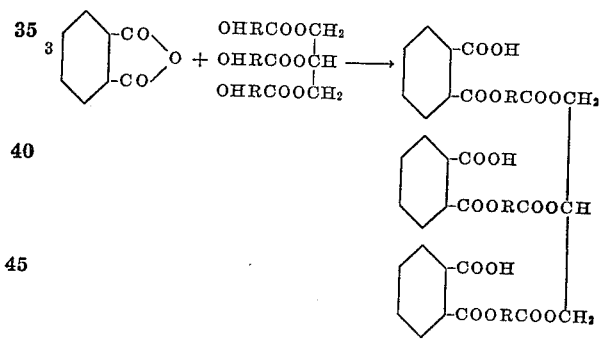

As aforesaid the foregoing product of esterification is a preferred material for use in increasing the dirt removal rate of filtering media in the practice of this invention. In the above product it is to be noted that each hydroxyl of polyhydric alcohol (glycerol) is esterified with a group containing an acyl-oxy radical derived from ricinoleic acid. In this application only those compounds are covered wherein each hydroxyl of each polyhydric alcohol is esterified with a group containing an acyl-oxy radical derived from a detergent-forming mono-carboxy acid having 8 to 38 carbon atoms. It is not necessary that each of the hydroxyls contained in an acyl-oxy radical be esterified although this is a characteristic of preferred compounds covered herein. For example, the hydroxyl in only one or two of the ricinoleic residues may be replaced by a phthalic acid residue or the equivalent.

In carrying on the esterification reaction it is not essential that a carboxylic group of the polybasic carboxylic acid react with the alcoholiform hydroxyl in the acyl-oxy radical of an hydroxylated detergent-forming acid body while the acyl-oxy radical of the detergent-forming carboxy acid remains directly connected with the polyhydric alcohol radical. Thus in the esterification reaction above mentioned there may be some molecular rearrangement with the production of a compound which may be represented by the following formula:

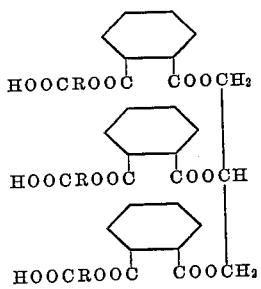

The compound above represented is likewise suitable for use in increasing the dirt removal rate of filtering media in the practice of this invention. It is to be noted that in this compound also there is the characteristic occurrence of a group containing at least one acyl-oxy radical derived from a detergent-forming carboxy acid esterified with each hydroxyl of polyhydric alcohol. In this particular example the group containing the acyl-oxy radical (RCOO) that is esterified with the hydroxyls of the polyhydric alcohol is the group

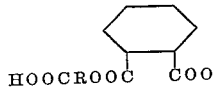

The compounds covered herein do not include compounds such as

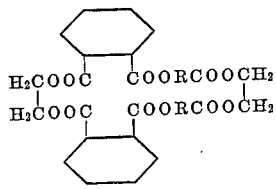

wherein the number of groups containing an acyl-oxy radical derived from a detergent-forming mono-carboxy acid and esterified with hydroxyls of each polyhydric alcohol (two glycol residues in the example above given) is less than the total number of polyhydric alcohol hydroxyls. In the example given there is a total of four polyhydric alcohol hydroxyls and only two groups containing an acyl-oxy radical derived from a detergent-forming mono-carboxy acid esterified therewith.

While the modifications wherein the acyl-oxy radical derived from the detergent-forming carboxy acid remains directly connected to the polyhydric alcohol residue is normally preponderant and is normally preferred, the other modifications wherein one or more of the polybasic carboxy acid radicals becomes directly attached to the polyhydric alcohol radical are suitable.

In the foregoing and in subsequent formulae a conventional showing in two dimensional form is resorted to, and no attempt other than this is made to indicate actual space molecular formulae. Moreover, distinctions between isomeric forms are to be disregarded.

As a further example of the practice of this invention phthalic acid may be reacted with an hydroxylated partial ester wherein each of the hydroxyls of glycol is replaced by a residue of hydroxy stearic acid or ricinoleic acid, the reaction being as follows:

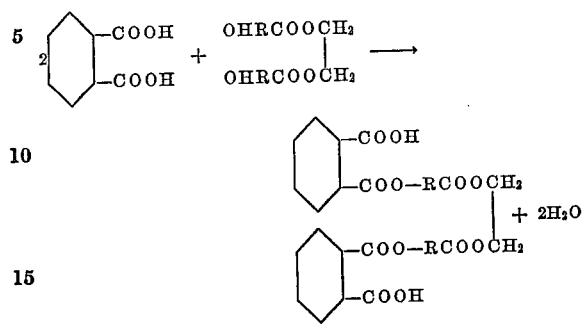

It is also possible that during the esterification there may be only partial molecular rearrangement so that in the resulting product one acyl-oxy radical of a detergent-forming mono-carboxy acid may be directly linked to the polyhydric alcohol radical and another acyl-oxy radical of a detergent-forming mono-carboxy acid may be directly linked to a polybasic carboxy acid radical which in turn may be directly linked to the polyhydric alcohol radical. Thus in the foregoing reaction involving glycol a reaction product may be formed corresponding with the formula

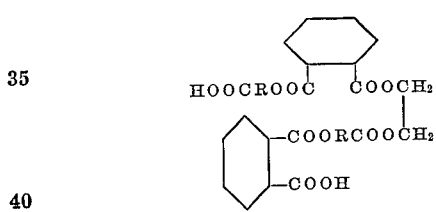

and such compounds are also suitable for increasing the dirt removal rate of filtering media according to this invention.

It is not essential that each of the acyl-oxy radicals derived from a detergent-forming acid that is present in the ester product for each of the hydroxyl groups of the parent polyhydric alcohol be hydroxylated so long as at least one of the acyl-oxy radicals is hydroxylated and thereby affords in the partial ester at least one basic ester forming group for esterification with a carboxyl of a polybasic carboxylic acid. For example, a suitable partial ester for reaction with a polybasic carboxy acid may be a mixed ester such as

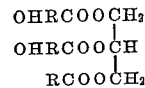

or

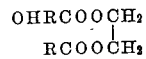

wherein OHRCOO is an hydroxylated acyl-oxy radical derived from an hydroxylated detergent-forming acid such as ricinoleic acid, hydroxy stearic acid, or the like, and wherein RCOO is an acyl-oxy group derived from a non-hydroxylated detergent-forming acid such as oleic acid, palmitic acid, stearic acid, abietic acid, etc. Hydroxylated partial esters of mixed type, such as those exemplified above will readily react with a polybasic carboxy acid such as phthalic acid to form an ester product suitable for increasing the dirt removal rate of filtering media in the practice of this invention.

A wide variety of polyhydric alcohols may be employed both of the ether and non-ether types. The following are illustrative of partial esters which are derived from polyhydric alcohols of the ether type and which are suitable for reaction with a polybasic carboxy acid:

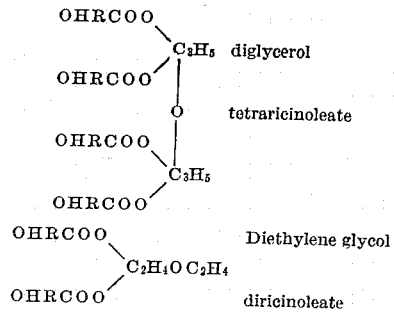

Examples of other polyhydric alcohols from which suitable ester products may be derived are triglycerol, triethylene glycol, dipropylene glycol, alpha beta gamma butane triol, beta methyl glycol, glycerol ether, 1,3 propane diol, isobutylene glycol, monoethylene glycol ether, mannitol, sorbitol, sorbitol monobutyl ether, erythriol, adonitol, sorbitan, mannitan, etc.

As mentioned above, it is preferable to carry on the esterification reaction so that at least one carboxyl group remains for each polybasic carboxylic acid residue. However, those products are suitable that are produced by reaction such that each of the carboxyl groups of the polybasic carboxy acid reacts with an alcoholiform hydroxyl. Thus if a molecular quantity of triricinolein is heated to approximately 180° C. or higher, with one molecular quantity of phthalic anhydride, the reaction product may ultimately involve two of the hydroxyls of the triricinolein with loss of water as indicated in the following formula:

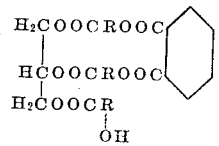

It is normally preferable, however, to control the esterification reaction so that there is at least one free carboxyl group present in the ultimate ester product. This can be accomplished by not utilizing an excessively high temperature or prolonged periods of reaction. The preferred product containing a free carboxyl group is the product that is most readily prepared in commercial production.

In carrying on the esterification reaction there may develop cross linkages either through the polyhydric alcohol or through the polybasic carboxylic acid due to the polyfunctionality of these materials. For example, in an esterification reaction between triricinolein and phthalic acid, the resulting product may comprise more complex molecules such as the following which illustrate cross linkage through the polyhydric alcohol residue.

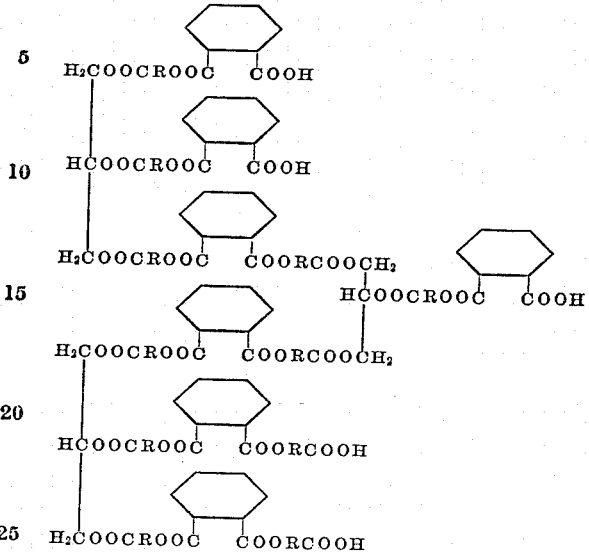

Cross linkage likewise may occur through the polybasic carboxy acid to afford molecular structures such as

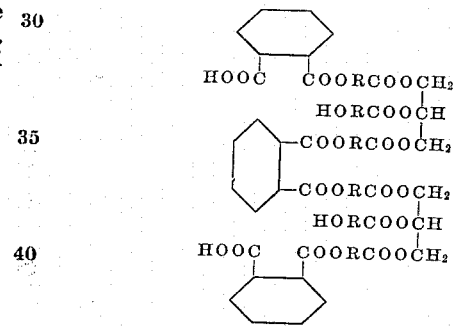

It is apparent that other cross linkages may occur. Such ester products containing more complex molecules are also suitable. It is also apparent that there may be great variations in the molecular weight of the product. The molecular weight of the ester product as determined by cryoscopic methods or from obvious composition of the ester usually runs between about 300 and about 4000 and is seldom over 6000. Ester products having a molecular weight over about 10,000 preferably are not employed. During the esterification reaction there may be some polymerization and polymerized products as well as simple monomers may be used.

In the ester product the presence of a residual hydroxyl group is largely immaterial provided that the residual hydroxyl is not directly attached to a polyhydric alcohol residue. Any such residual hydroxyl group may be left as such or, if desired, reacted either with additional polybasic carboxy acid or with monobasic detergent-forming carboxy acid. Alternatively any such residual hydroxyl may be acylated with monocarboxy acids containing less than 8 carbon atoms. The ester product covered herein may include such simple acylated derivatives; but the finished product must contain at least one acyloxy radical derived from a detergent-forming monobasic carboxy acid having at least 8 carbon atoms in a group that is esterified with each hydroxyl group of each parent polyhydric alcohol.

Referring to any residual carboxyl group or groups it is preferable that such group or groups be left as such. If desired, however, the carboxyl group may be converted to a metal salt such as the salt of sodium, potassium, calcium, magnesium, iron, etc. If desired, the carboxyl group or groups may be reacted with an alkali metal compound and then converted by metathesis to a salt of a metal such as aluminum, copper, zinc, etc. Similarly the carboxyl group can be converted into an ammonium salt, or a substituted ammonium salt, by use of ammonia, or an amine, or an hydroxylated amine. When an hydroxylated amine is used the acidic hydrogen of the carboxyl group may be replaced by esterification involving the alcoholic hydroxyl of the hydroxylated amine or by simple neutralization. Examples of suitable amines or amino-alcohols are amyl amine, cyclohexyl amine, ethanol amine, aminomethyl propanol, etc. The acid hydrogen may also be replaced by reaction with an alcoholiform hydroxyl of an hydroxylated acid. The acid hydrogen may also be replaced by a residue of a monohydric alcohol, e. g., aliphatic alcohols, such as methyl, ethyl, propyl, hexyl, octyl, decyl, cetyl, ceryl, etc.; alicyclic alcohols such as cyclohexanol and the like; or aralkyl alcohols such as benzyl alcohol, naphthyl ethyl alcohol, and the like. Similarly, the acid hydrogen may be replaced by reaction with an ether alcohol such as those derived by reacting any of the foregoing alcohols with an alkylene oxide such as ethylene oxide, propylene oxide, butylene oxide, or the like (but excluding compounds such as glycide or the like), typical ether alcohols of the kind mentioned being illustrated by the following formulae:

$$C_4H_9\ OC_2H_4OC_2H_4.OH$$

$$C_4H_9\ OC_2H_4.OH$$

$$C_8H_{17}\ OC_2H_4.OH$$

$$C_6H_{11}\ OC_2H_4.OH$$

$$C_6H_5\ CH_2OC_2H_4.OH$$

By reacting hydroxy aromatic compounds such as phenol, naphthol and the like with an alkylene oxide, such compounds can be converted to mono-hydroxy aralkyl ethers which are suitable and such compounds together with alphyl, alicyclic and aralkyl alcohols and alcohol ethers are regarded as alkyl alcohols and as comprising an alkyl group as the term "alkyl" is used herein. As aforesaid, aryl groups are not regarded as included in the term "alkyl" (although aralkyl groups are included). A polyhydric alcohol residue may be present in a group which replaces the acid hydrogen of the carboxyl group provided each hydroxyl of the alcohol is esterified with a group containing at least one acyl-oxy group of a detergent-forming carboxy acid having at least 8 carbon atoms. When reference is made to an ester product containing a free carboxyl group, it is intended that the product contain a COOH group in which the acid hydrogen has not been replaced. Ester products containing a carboxylic group may be in the form of an acid or a salt or an ester as mentioned hereinabove. Since, however, products containing a free carboxyl are normally preferred, the additional expense of neutralizing the acid hydrogen of a free carboxyl usually is not incurred.

While reference has been made hereinabove to various detergent-forming monocarboxy acids, it is apparent that simple derivatives such as the halogenated compounds are functional equivalents. For example, chlorinated ricinoleic acid or chlorinated triricinolein may be employed instead of ricinoleic acid or triricinolein. Brominated oleic acid may be used instead of oleic acid. Also hydrogenated abietic acid may be used instead of abietic acid. In such cases the monobasic detergent-forming carboxy material, notwithstanding modifications of the kind indicated still has the same functional properties as the unmodified material, and thus acts in the same manner as far as esterification reactions of the character herein described are concerned. It is also possible, for example, to condense two moles of ricinoleic acid and produce one mole of monobasic diricinoleic acid. Likewise monobasic triricinoleic acid and monobasic tetraricinoleic acid may be used. Also the condensation product of a substance such as ricinoleic acid or hydroxy stearic acid with some non-fatty hydroxy acid such as lactic acid may be used. It is to be understood that the term detergent-forming monobasic carboxy acid includes such functional equivalents.

Some of the ester products above described are somewhat soluble in oil while others are substantially insoluble in oil. If the ester product is such that only one part or less is soluble (as determined by usual visual methods) in one thousand parts of ordinary straight-run kerosene from Pennsylvania crude, the product is to be regarded as substantially insoluble in oil. For use in increasing the dirt removal rate of filtering media according to this invention it is preferable that the ester product be substantially insoluble in oil. Most of the ester products hereinabove described are sub-resinous in character and of a tarry or balsam-like consistency. In the case of some of the interacting materials, especially the polyhydroxylated fatty bodies, it is possible by prolonged heating at relatively high temperatures to obtain a product that is of a hard horny character and lacks appreciable solubility in oil or in lower aliphatic alcohols. Care should be taken not to produce such hard and totally oil-insoluble bodies. It may be mentioned, however, that a trace of solubility such as a few parts dissolving in one hundred thousand parts of kerosene of the character above mentioned affords a satisfactory product for increasing the filtering rate of filtering media in the practice of this invention.

The production of preferred ester products which are substantially oil insoluble or of low oil solubility can readily be achieved having in mind the following factors which influence oil solubility of the ester product. Thus oil solubility is decreased when the polybasic carboxy acid employed in the esterification reaction has a relatively low number of carbon atoms. For example, a product made using phthalic acid will have less oil solubility than a product derived by reaction with naphthalic acid; and a product made using citric acid or maleic acid will have even less oil solubility than a product derived by reaction with phthalic acid. However, for most purposes single ring polybasic aromatic carboxylic acids and particularly dibasic aromatic carboxylic acids such as phthalic acid are to be preferred. Oil solubility is also affected by the nature of any substituent for the acid hydrogen of a residual carboxyl group in the ester product. Thus an ester product wherein the carboxyl group is retained has less oil solubility than a product wherein the acid hydrogen is replaced by an alkyl hydrocarbon. Ester products containing a free carboxyl group are preferred from the standpoint of their effectiveness in increasing the dirt removal rate of filtering media. Those products which contain a plurality of free carboxyl groups, e. g. one for each polybasic carboxylic radical contained therein, are especially to be preferred. Also it is preferable that the free carboxyl occur in a polybasic carboxylic acid radical. If the acid hydrogen of a carboxyl group is replaced by an oxy alkyl group, e. g., an oxy alkyl group derived from a monohydric ether alcohol, so that the carbon atoms in the alkyl group are separated by at least one oxygen atom, the oil solubility will be decreased as compared with a product wherein the acid hydrogen of the carboxyl group is replaced by an hydrocarbon alkyl group and such compounds containing an oxy alkyl group are among preferred products for use according to this invention. Oil solubility can also be decreased by selecting a detergent-forming monobasic carboxylic body that has a relatively low number of carbon atoms. Thus fatty bodies and hydroxylated fatty bodies having a relatively low number of carbon atoms (but more than 8 carbon atoms) are to be preferred. While there are other factors affecting oil solubility, the foregoing discussion is believed to be adequate to enable one to obtain ester products having desired properties of oil solubility. While it is preferable to employ ester products which are substantially insoluble in oil as defined above, those ester products which are more soluble in oil likewise may be employed.

Generally speaking ester products hereinabove described are substantially water insoluble, namely, are not more soluble than 1 part in 1000 parts of water at 50° to 80° F. Water insolubility is not particularly important, however, because water in more than very small amounts does not occur in the oil which is used in the lubricating system of an internal combustion engine and which is clarified by the use of a filter. The ester products that are used to increase the dirt removal rate of filtering media in the practice of this invention preferably are totally or substantially water insoluble.

In the preparation of esterification products adapted for use in increasing the dirt removal rate of filtering media in a filtering operation, the esterification reaction may be caused to take place readily upon the application of heat, the reaction being more rapid the higher the temperature that is employed, but care should be taken not to employ excessively high temperatures which would cause decomposition. The reaction may, if desired, be in the presence of an inert solvent such as xylene, which may be removed upon the completion of the reaction. When water is formed as a reaction product the esterification reaction may be conducted under a reflux condenser using a water trap to remove water as it is formed. The reaction can also be hastened by passing through the reacting materials a dried inert gas such as nitrogen or $CO_2$. Generally speaking, however, the reactions take place rapidly, quickly and completely by simply heating substances to enter into the reaction in desired stoichiometric proportions at a temperature above the boiling point of water, usually between about 110° and 160° C. provided there is no decomposition. The most desirable products are obtained by combinations in which the ratio of moles of polybasic carboxylic acid to moles of particular material reacted therewith is within the ratios of 1 to 3 and 3 to 1. It is not essential that the moles of polybasic carboxylic acid material or of partial ester material be the same material. For example one mole of triricinolein might be reacted with a mole of phthalic anhydride and with one mole of some other anhydride. It may be mentioned that when the polybasic carboxylic acid is used in the anhydride form esterification can take place without forming water as a reaction product and that the use of the polybasic carboxy acid in anhydride form is normally preferable for this reason.

*Example 1*

In order to afford a specific example of the practice of this invention, the formation of a suitable ester product from phthalic anhydride and castor oil will be described. As a suitable polybasic carboxy acid phthalic anhydride or phthalic acid is preferred because it is an aromatic dibasic carboxylic acid. It is also preferred because of its high resistance to decomposition during the esterification reaction and because it is economically available in a suitably pure form. Castor oil is preferred because the hydroxylated fatty acid radical is esterified with the glycerol radical and the esterification reaction therefor can readily be controlled. Moreover, castor oil is readily available in a suitably pure state.

One pound mole of triricinolein (in the form of castor oil which ordinarily contains approximately 85 to 95 per cent. triricinolein) is reacted with 2½ pound moles of phthalic anhydride to produce a mixture of acid phthalates consisting essentially of triricinolein dibasic phthalate and triricinolein tribasic phthalate. The reaction may be caused to occur by heating the mixed materials at a temperature of approximately 120° to 140° C. for approximately 6 to 12 hours. The reaction can be followed roughly by withdrawing a small sample of the partially reacted mass and permitting it to cool on a watch crystal. When the reaction has become completed no crystals of phthalic anhydride appear. When the sample no longer shows the presence of such crystals on cooling, it can be titrated with a standard volumetric alkaline solution so as to indicate that the acid which remains is due entirely to carboxylic hydrogen and not to any unreacted phthalic anhydride. If care is taken not to use too high temperatures which would cause formation of heterocyclic bodies of the character above referred to, one can depend upon the standard alkaline solution to indicate the disappearance of the phthalic anhydride. It is not to be inferred, however, that any cyclic bodies, if formed, would be unsuitable.

*Example 2*

Maleic acid or anhydride is substituted for phthalic anhydride in preceding Example 1 to give the corresponding maleic acid derivative, that is triricinolein dibasic maleate and triricinolein tri-basic maleate.

*Example 3*

Adipic acid or anhydride is substituted for phthalic anhydride in preceding Example 1 to give the corresponding adipic acid derivative, that is triricinolein dibasic adipate and triricinolein tribasic adipate.

*Example 4*

Succinic acid or anhydride is substituted for phthalic anhydride in preceding Example 1 to give the corresponding succinic acid derivative, that is triricinolein dibasic succinate and triricinolein tribasic succinate.

Example 5

The neutral ester derived from ricinoleic acid and ethylene glycol, that is ethylene glycol diricinoleate, is substituted for triricinolein in preceding Examples 1 to 4 inclusive, and the ratio of dibasic acid changed so as to correspond to one and one-half pound moles of a dibasic acid or anhydride for each pound mole of ethylene glycol diricinoleate.

The products of the esterification produced according to Examples 1 to 5 are viscous yellowish oily materials resembling somewhat blown castor oil consistency. They are only slightly soluble in either water or in paraffin base mineral oil (not more than 1 part to 1000) but go into solution with lower alcohols (methyl to octyl) to form a clear solution. The solutions may be made up in equal parts for example.

The esterification product above described when used in conjunction with a filter in a filtering operation sharply increases the dirt removal rate of the filter. The product may be used in a number of different ways. Thus, in a paper type filter the product, either by itself or mixed with a solvent such as alcohol, preferably is applied to the surface of the paper covering all or a portion of the total paper surface exposed to oil. Cloth filters may be similarly treated. Cotton linters filters preferably are treated by adding the product either diluted or undiluted to cotton linters either on the surface or throughout the body thereof. Other filtering mediums sufficiently porous to permit oil to flow therethrough but sufficiently compact to filter out solid particles may be similarly treated. The product is also effective when incorporated in filters or filter mediums in other ways than those above mentioned. Moreover, whenever the product is permitted to contact oil that passes through the filtering medium it is effective to increase the rate of dirt removal by the filtering medium. Thus, if the product is applied to a screen or the like through or past which the oil passes before reaching the filtering medium, the dirt removal rate of the medium is increased. If the product is merely introduced into the casing within which the filtering medium is contained, it is effective.

The amount of the product that is used depends upon the increase in dirt removal rate that is desired. Ordinarily, for commercial purposes a small amount, such as about 2 to 25 grams, is all that is desirable for use in connection with a filter of proper size for the average automobile. Use of as little as 4 grams gives a very pronounced increase in dirt removal rate and the dirt removal rate is only slightly increased by using 5 or 6 times this amount.

As above mentioned, the use of an additive of the type above defined sharply increases the dirt removal rate. In other words, when a filtering operation is carried on using these additives in conjunction with a filter, a single filter can be made which can remove dirt as fast as the dirt could be removed by the use of a plurality of untreated filters. In thus increasing the dirt removal rate, the improved result is secured chiefly through a greater removal of solids in a single passage through the filtering medium.

The improvements in the rate of dirt removal from lubrication oil that may be effected by the additives herein defined, have been tested by the following procedure. From a heated tank containing six quarts of oil, oil was withdrawn by a pump and forced continuously at 45 pounds per square inch pressure into a standard type automobile filter and the filtered oil was returned to the tank. Starting with clean oil, 5 grams of solids of the type formed in automobiles were added to the oil in the tank in such manner as to be thoroughly distributed throughout the oil in the tank, and observation was made of this oil to determine the number of minutes required to clean it to .02% solid content after each addition of the dirt. At two-hour intervals, additional 5-gram dirt charges were added and observations made of the length of time required to clean the oil in the tank to .02% solids after each dirt addition. Comparative tests were run with two sets of similar filters, the filters of one set being treated with the additive and the filters of the other set not being so treated. After each filter had reached the condition where oil in the tank contained .1% solids two hours after the dirt was added, the amount of dirt in the filter was determined by subtracting the amount of dirt remaining in the tank from the amount of dirt added during the test. The results for each set of filters were averaged. Using ester products above described, it was found that the treated filter cleaned up the first addition of dirt much more rapidly than the untreated filter and with subsequent dirt additions, the advantage in favor of the treated filter persisted. The life of the treated filter was not materially greater than that of the untreated filter.

According to this invention, additives that sharply increase the dirt removal rate of filtering media are made available which retain their effectiveness for the full life of the filter, withstand the temperatures encountered in internal combustion engine lubrication without volatilization, remain absorbed or deposited on the filtering medium during its use, and impart no injurious effects to the oil being filtered. The additive may be used without requiring any material change in the manufacture of the filter. Because of the faster dirt removal rate resulting from the use of the additive, the treated filter reduces the accumulation of solid particles and abrasive matter in the lubricant materially below that obtainable by a similar filter that has not been treated and thereby enhances the efficacy of the lubricant.

While this invention has been described in connection with a number of examples of products suitable for use in increasing the dirt removal rate of filtering media according to this invention, it is to be understood that this has been done merely for the purpose of illustration and exemplification and that the scope of this invention is to be governed by the language of the following claims considered in the light of the foregoing description.

We claim:

1. A filter for use in connection with the lubricating system of an internal combustion engine, said filter comprising a casing containing a filtering medium which is sufficiently porous to permit oil to flow therethrough but sufficiently compact to filter out solid particles, said filter comprising for contact with oil passing therethrough an agent for increasing the dirt removal rate of said filtering medium, said agent comprising an ester containing (a) at least one polyhydric alcohol radical, (b) at least one polybasic carboxylic acid radical, and (c) a plurality of acyloxy radicals each having 8 to 38 carbon atoms derived from any detergent-forming monocarboxy acid having 8 to 38 carbon atoms with the proviso that at least one of said acyl-oxy radicals is derived from an hydroxylated detergent-forming mono-carboxy acid having 8 to 38 carbon atoms, each said polyhydric alcohol radical being ester-linked with a plurality of groups each of which groups contains at least one of said acyl-oxy radicals, the number of said groups ester-linked to each polyhydric alcohol radical being at least equal in number in each instance to the valency of the polyhydric alcohol radical so that each polyhydric alcohol radical is free from any uncombined hydroxyl radical directly attached thereto and being additional to the number of such groups ester-linked to any other polyhydric alcohol radical contained in the ester, and at least one of said groups containing a polybasic carboxylic acid radical.

2. A filter according to claim 1 wherein said ester contains only one polyhydric alcohol radical.

3. A filter according to claim 1 wherein each of said acyl-oxy radicals is an acyl-oxy radical derived from a fatty acid having 8 to 32 carbon atoms.

4. A filter according to claim 1 wherein each of said acyl-oxy radicals is an acyl-oxy radical derived from an hydroxylated fatty acid having 8 to 32 carbon atoms.

5. A filter according to claim 1 wherein said ester contains at least one free carboxyl group.

6. A filter according to claim 1 wherein each polybasic carboxylic radical is derived from a dibasic carboxylic acid and said ester contains at least one free carboxyl group for each polybasic carboxylic acid radical contained therein.

7. A filter according to claim 1 wherein said ester contains a product of esterification between castor oil and maleic acid, there being a free carboxyl group for each radical in the product that is derived from maleic acid.

8. A filter according to claim 1 wherein said ester contains a product of esterification between castor oil and adipic acid, there being a free carboxyl group for each radical in the product that is derived from adipic acid.

9. A filter according to claim 1 wherein said ester contains a product of esterification between castor oil and phthalic acid, there being a free carboxyl group for each radical in the product that is derived from phthalic acid.

10. A filter according to claim 1 wherein said ester is substantially insoluble in oil.

11. A filter according to claim 1 wherein said ester is substantially insoluble in oil and is substantially insoluble in water.

12. A filter for use in connection with the lubricating system of an internal combustion engine, said filter comprising a casing containing a filtering medium which is sufficiently porous to permit oil to flow therethrough but sufficiently compact to filter out solid particles, said filter comprising for contact with oil passing therethrough an agent for increasing the dirt removal rate of said filtering medium, said agent comprising an ester containing (a) at least one polyhydric alcohol radical, (b) at least one polybasic carboxylic acid radical, and (c) a plurality of acyl-oxy radicals each having 8 to 38 carbon atoms derived from any detergent-forming mono-carboxy acid having 8 to 38 carbon atoms, each of said polyhydric alcohol radicals being directly ester-linked to a plurality of said acyl-oxy groups corresponding in number to the valency of said polyhydric alcohol radical so that each polyhydric alcohol radical is free from any uncombined hydroxyl radical directly attached thereto, and at least one of said acyl-oxy radicals contained in the ester and ester-linked to a polyhydric alcohol radical being derived from an hydroxylated detergent forming mono-carboxy acid having 8 to 38 carbon atoms and being also connected to a said polybasic carboxylic acid radical.

13. A filter according to claim 12 wherein said oxy-acyl radicals include an oxy-acyl radical derived from a fatty acid having 8 to 32 carbon atoms.

14. A filter according to claim 12 wherein said ester contains a free carboxyl group.

15. A filter for use in connection with the lubricating system of an internal combustion engine, said filter comprising a casing containing a filtering medium which is sufficiently porous to permit oil to flow therethrough but sufficiently compact to filter out solid particles, said medium having applied thereto as an agent to increase the dirt removal rate of said filtering medium an ester containing (a) at least one polyhydric alcohol radical, (b) at least one polybasic carboxylic acid radical, and (c) a plurality of acyl-oxy radicals each having 8 to 38 carbon atoms derived from any detergent-forming mono-carboxy acid having 8 to 38 carbon atoms with the proviso that at least one of said acyl-oxy radicals is derived from an hydroxylated detergent-forming mono-carboxy acid having 8 to 38 carbon atoms, each said polyhydric alcohol radical being ester-linked with a plurality of groups each of which groups contains at least one of said acyl-oxy radicals, the number of said groups ester-linked to each polyhydric alcohol radical being at least equal in number in each instance to the valency of the polyhydric alcohol radical so that each polyhydric alcohol radical is free from any uncombined hydroxyl radical directly attached thereto and being additional to the number of such groups ester-linked to any other polyhydric alcohol radical contained in the ester, and at least one of said groups containing a polybasic carboxylic acid radical.

16. A filter according to claim 15 wherein said acyl-oxy radical is an acyl-oxy radical derived from a fatty acid having 8 to 32 carbon atoms and said ester is substantially insoluble in oil.

17. A method of increasing the dirt removal rate of a filtering medium for removing dirt from the lubricating oil of an internal combustion engine, said method comprising contacting oil that is to be filtered by said filtering medium with an ester containing (a) at least one polyhydric alcohol radical, (b) at least one polybasic carboxylic acid radical, and (c) a plurality of acyl-oxy radicals each having 8 to 38 carbon atoms derived from any detergent-forming mono-carboxy acid having 8 to 38 carbon atoms with the proviso that at least one of said acyl-oxy radicals is derived from an hydroxylated detergent-forming mono-carboxy acid having 8 to 38 carbon atoms, each said polyhydric alcohol radical being ester-linked with a plurality of groups, each of which groups contains at least one of said acyl-oxy radicals, the number of said groups ester-linked to each polyhydric alcohol radical being at least equal in number in each instance to the valency of the polyhydric alcohol radical so that each polyhydric alcohol radical is free from any uncombined hydroxyl radical directly attached thereto and being additional to the number of such groups ester-linked to any other polyhydric alcohol radical contained in the ester, and at least one of said groups containing a polybasic carboxylic acid radical.

18. A method according to claim 17 wherein said ester contains only one polyhydric alcohol residue.

19. A method according to claim 17 wherein said acyl-oxy radicals include an acyl-oxy radical derived from a fatty acid having 8 to 32 carbon atoms.

20. A method according to claim 17 wherein each of said acyl-oxy radicals is an acyl-oxy radical derived from an hydroxylated fatty acid having 8 to 32 carbon atoms.

21. A method according to claim 17 wherein said ester contains at least one free carboxyl group.

22. A method according to claim 17 wherein each polybasic carboxylic radical is derived from a dibasic carboxylic acid and said ester contains a plurality of carboxyl groups.

23. A method according to claim 17 wherein said ester contains a product of esterification between castor oil and maleic acid, there being a free carboxyl group for each radical in the product that is derived from maleic acid.

24. A method according to claim 17 wherein said ester contains a product of esterification between castor oil and adipic acid, there being a free carboxyl group for each radical in the product that is derived from adipic acid.

25. A method according to claim 17 wherein said ester contains a product of esterification between castor oil and phthalic acid, there being a free carboxyl group for each radical in the product that is derived from phthalic acid.

26. A method of increasing the dirt removal rate of a filtering medium for removing dirt from the lubricating oil of an internal combustion engine, said method comprising contacting oil that is to be filtered by said filtering medium with an ester containing (a) at least one polyhydric alcohol radical, (b) at least one polybasic carboxylic acid radical, and (c) a plurality of acyl-oxy radicals each having 8 to 38 carbon atoms derived from any detergent-forming mono-carboxy acid having 8 to 38 carbon atoms each of said polyhydric alcohol radicals being directly ester-linked to a plurality of said acyl-oxy groups corresponding in number to the valency of said polyhydric alcohol radical so that each polyhydric alcohol radical is free from any uncombined hydroxyl radical directly attached thereto, and at least one of said acyl-oxy radicals contained in the ester and ester-linked to a polyhydric alcohol radical being derived from an hydroxylated detergent forming mono-carboxy acid having from 8 to 38 carbon atoms and being also connected to a said polybasic carboxylic acid radical.

27. A method according to claim 26 wherein each of said acyl-oxy radicals is an acyl-oxy radical derived from a fatty acid having 8 to 32 carbon atoms.

28. A method according to claim 26 wherein said ester contains a free carboxyl group.

DONALD H. WELLS.
MELVIN DE GROOTE.